United States Patent

Plowman et al.

[11] 3,778,185
[45] Dec. 11, 1973

[54] COMPOSITE STRUT JOINT CONSTRUCTION

[75] Inventors: James S. Plowman, Longmeadow, Mass.; Ivar G. Fowkes, East Hartford, Conn.

[73] Assignee: United Aircraft Corporation, East Hartford, Conn.

[22] Filed: Aug. 28, 1972

[21] Appl. No.: 284,388

[52] U.S. Cl. .................... 415/217, 415/214, 138/37
[51] Int. Cl. ......................... F01d 9/02, F04d 29/44
[58] Field of Search ................... 415/216, 217, 218, 415/214, 208; 416/241 A; 138/37; 52/84; 287/82

[56] References Cited
UNITED STATES PATENTS

| | | | |
|---|---|---|---|
| 2,516,819 | 7/1950 | Whittle | 138/37 |
| 2,648,353 | 8/1953 | Haworth | 138/37 |
| 2,809,491 | 10/1957 | Wosika | 138/37 |
| 2,924,425 | 2/1960 | Cutler | 415/217 |
| 3,095,138 | 6/1963 | Wavnken | 415/217 |
| 3,588,267 | 6/1971 | Wilkinson | 416/241 A |
| 3,708,242 | 1/1973 | Bruneau et al. | 415/217 |
| 3,703,194 | 11/1972 | Giordano | 138/109 |

Primary Examiner—Henry F. Raduazo
Attorney—Vernon F. Hauschild

[57] ABSTRACT

A composite strut includes an end extending radially through an opening in the wall of a cylindrical duct. The end of the strut has tapering surfaces forming a wedge-shaped cavity, and a wedge having the shape of the cavity is bonded to the surfaces of the cavity. The end of the strut also includes outwardly facing surfaces substantially parallel to and spaced from the tapered surfaces of the cavity. Stiffeners having surfaces in face-to-face abutting relationship to the outwardly facing surfaces are fixed to the duct and prevent the strut from being pulled radially through the duct opening. The stiffeners also absorb torsional and bending loads from the strut and transfer those loads into the duct.

9 Claims, 7 Drawing Figures

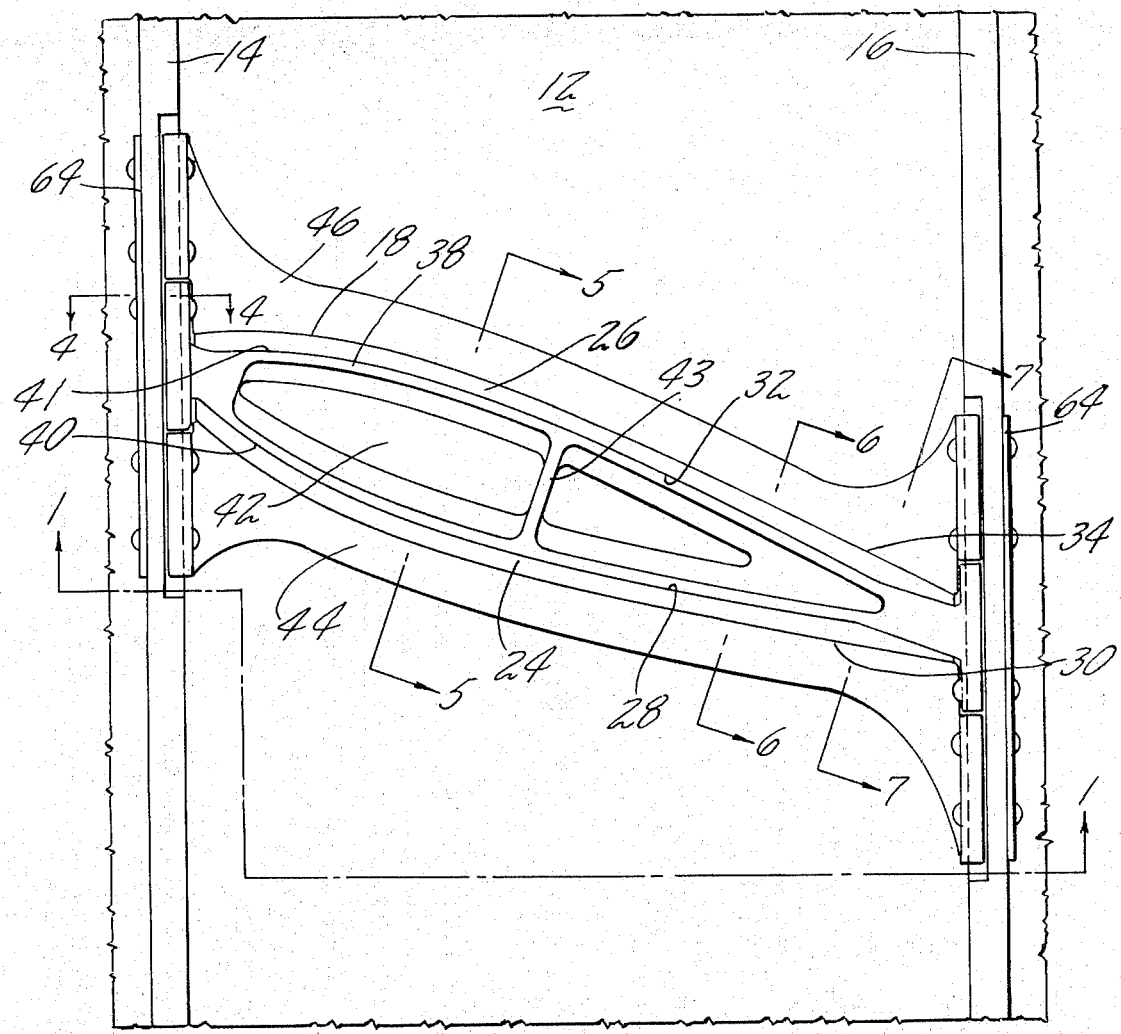

COMPOSITE STRUT JOINT CONSTRUCTION

BACKGROUND OF THE INVENTION

1. Field of the Invention

This invention relates to a composite load transferring member and more particularly to a joint construction for attaching the member to supporting structure.

2. Description of the Prior Art

High strength filament reinforced composite materials have undergone considerable research and development in recent years for use in aircraft engines, such as for rotor and stator blades. The main reason for this research and development is the extremely high strength to weight ratio of these materials. A major difficulty with these materials is that their strength is essentially unidirectional, since the filaments are extremely strong in tension; additionally, the use of a composite member as a structural or load transferring member poses the problem of transferring loads from the member into surrounding structure. Joint constructions which may be suited to withstanding the gas blending loads imposed upon a typical gas turbine engine compressor stator vane may not be suitable for structural members which must carry loads 10 or 20 times as great.

Most frequently the composite member is made up of a plurality of individual plies bonded together, the plies having the axis of their filaments oriented in the direction of the tensile load within the member; however, the member is often fastened to surrounding structure in a manner which inherently tends to cause adjacent plies to peel apart or tends to bend and break the filaments which are sometimes brittle.

The patent to Higgins U.S. Pat. No. 2,874,937 recognizes the face that the shear strength of an adhesive bond between a composite member and other structure is very low as compared to the tensile strength of the composite member itself; to obtain full utilization of the high strength of the composite member, Higgins keeps the bonded surfaces constantly pressed together. The Higgins patent secures a cylindrical rod end within a cylindrical sleeve by applying adhesive to the cylindrical surface of the rod end and then driving a conical wedge into the rod end to spread the end apart thus creating a high pressure between the rod surface and the cylindrical sleeve. This pressure is maintained during curing of the adhesive bonding agent and during utilization of the parts, if desired, by leaving the conical wedge within the rod end.

SUMMARY OF THE INVENTION

An object of the present invention is an improved joint construction between a composite structural member and adjacent support structure.

According to the present invention, the end of a composite strut extends through an opening in adjacent wall structure and includes a wall defining a wedge-shaped cavity having a wedge bonded to the cavity surface, the wall also including an outwardly facing surface substantially parallel to and spaced from the cavity surface, and stiffener structure surrounds the outwardly facing surface and has a surface in mating relationship thereto, the stiffener structure being securely attached to the wall structure.

Unlike the Higgins patent hereinbefore referred to which relies on the wedge for maintaining a constant high pressure between the bonded surfaces of the rod end and the cylindrical sleeve, the present invention does not require a bond between the outwardly facing wall surface of the strut and the mating surface of the stiffener structure; the bond relied on in this invention is the bond between the wedge and the cavity surface. As long as the wedge remains within the cavity, the strut end is prevented from being pulled through the wall structure opening by the presence of the stiffener structure.

In a preferred embodiment the strut is one of a plurality of radially extending airfoil shaped intermediate case struts secured substantially as described above at both its inner and outer ends to inner and outer ducts for transferring high magnitude radial, axial and torsional loads from the inner duct structure to the outer duct structure, whereupon these loads are transmitted to ground or into an airframe structure; these loads are in addition to normal gas blending loads on the strut. For additional integrity of the joint construction, it is preferable to bond the outwardly facing strut end wall surface to the mating stiffener structure surface, and to secure the wedge to the duct as well as to the strut, although in less demanding applications this would not be necessary.

A feature of the present invention is its usefulness in applications where hollow struts are required; this is a common requirement for gas turbine engine struts, not only to save weight, but more particularly to allow tubes, lines and instrumentation to be brought from locations deep within the engine to locations outside or surrounding the engine without being exposed to and interfering with the engine flow path. This feature is clearly demonstrated hereinafter in the Description of the Preferred Embodiment.

The foregoing and other objects, features and advantages of the present invention will become more apparent in the light of the following detailed description of the preferred embodiment thereof as illustrated in the accompanying drawing.

BRIEF DESCRIPTION OF THE DRAWING

FIG. 3 is a view taken along the line 3—3 of FIG. 1.

DESCRIPTION OF THE PREFERRED EMBODIMENT

Figure 1:
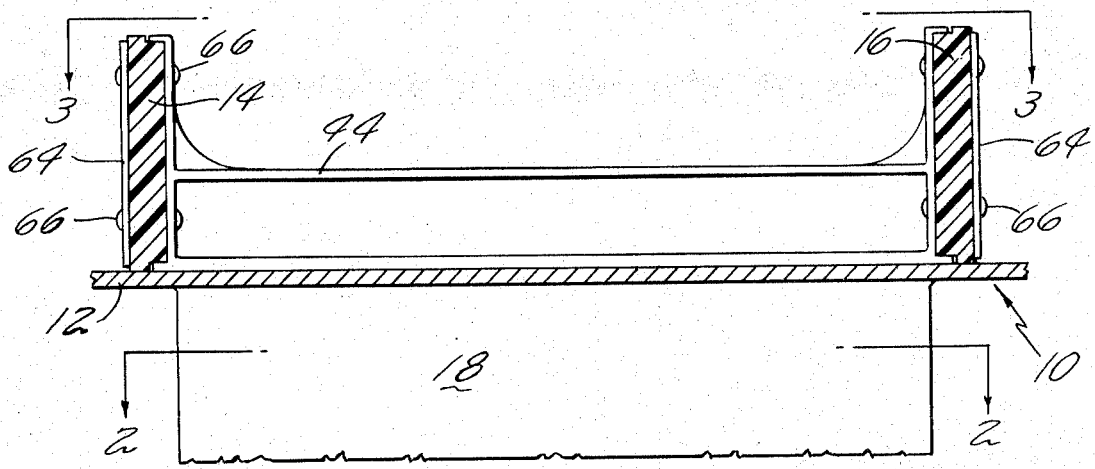
FIG. 1 is a partial sectional view taken along the line 1—1 of FIG. 2 showing a strut joined at one end to a duct wall in accordance with the present invention.
Figure 2:
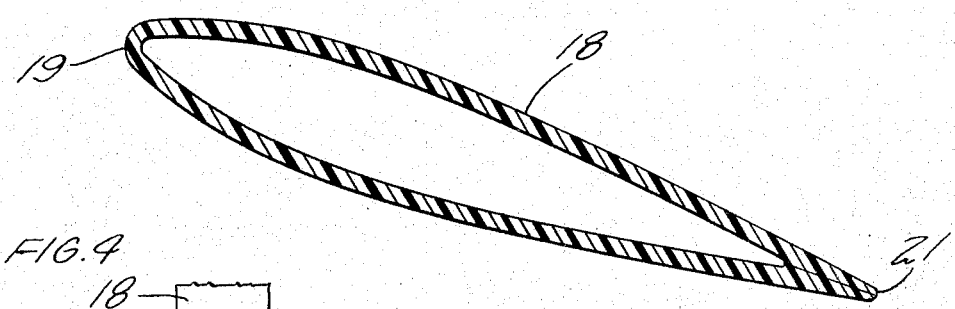
FIG. 2 is a sectional view taken along the line 2—2 of FIG. 1.

As an exemplary embodiment of the present invention, reference is made to FIGS. 1 and 2. FIG. 1 shows a duct 10 of a gas turbine engine (not shown); the duct 10 includes a substantially cylindrical duct wall 12 having an axis (not shown) running from left to right with respect to the drawing and being located below the figure and within the plane of the paper. The duct 10 also includes composite annular rings 14, 16 for providing additional hoop strength to the duct wall 12. Extending substantially radially with respect to the duct wall 10 is a composite strut 18 comprising substantially radially oriented filaments in a matrix material, such as carbon filament in an polyimide matrix. In this embodiment the strut 18 is hollow and substantially airfoil shaped in cross section, having a leading edge 19 and trailing edge 21, as shown in FIG. 2. Additionally, in this embodiment the strut 18 is one of the main structural elements of the engine; that is, it is not simply used to change the direction of the air within the engine flow path; it is rather used to carry and transmit large engine operating loads from the engine to structure on the aircraft carrying the engine. In other words, the strut 18 is subjected to extremely high tensile, torsional, and bending loads which are eventually transferred from the strut into the duct 10 and thence, through appropriate mounting structure (not shown), into the aircraft or to ground if the engine is a ground installation.

The joint construction of the present invention is best shown in FIGS. 3 through 7. FIG. 3 is a view looking along a radial line toward the center of the engine from a point external of the duct 10. As shown in FIGS. 4 through 7, the strut 18 includes an end portion 20 extending substantially radially through an opening 22 in the duct wall 12; in this embodiment the opening 22 is airfoil shaped in cross section and closely surrounds the outer surface of the strut 18. The end portion 20 includes outwardly flared walls 24, 26 which in this instance are simply extensions of the strut 18 which is hollow. The wall 24 includes inner and outer surfaces 28, 30, respectively; the wall 26 includes inner and outer surfaces 32, 34, respectively. The inner surfaces 28, 32 define a wedge-shaped cavity 36 which extends from the leading edge 19 to the trailing edge 21 and tapers toward the duct wall 12. Because the strut 18 is hollow, the cavity 36 does not taper to a point but is instead substantially trapezoidal in cross section. It should be clear that if the strut 18 were solid, then the walls corresponding to the walls 24, 26 of the present example could be formed simply by splaying the strut end into two walls; in that instance the cavity corresponding to the cavity 36 would be a wedge shape having a triangular or V cross section.

A wedge 38, which in this instance is titanium for light weight, is shaped such that its outer surfaces 40, 41 mate with the surfaces 28, 32, respectively, of the cavity 36. The surfaces 40, 41 are bonded to the surfaces 28, 32 using a polyimide resin or other suitable adhesive or bonding agent. The wedge 38 has been hollowed out extensively as shown to save weight and to allow tubes and lines (not shown) to pass through the hollow strut 18, such as through openings 42 (FIG. 3). The main consideration with respect to the wedge is that it be capable of withstanding high forces perpendicular to its outer surfaces 40, 41 without collapsing; for this reason a web 43 of material has been retained.

To complete the basic joint construction, C-shaped stiffeners 44, 46 are provided substantially surrounding and in face-to-face abutting relationship to the outer wall surfaces 30, 34, respectively, which are spaced from and substantially parallel to the cavity surfaces 28, 32, respectively. The stiffeners 44, 46 are attached to the duct 10 by any suitable means such as by bonding legs 48 and 50 to the duct wall 12. The main function of the stiffeners 44, 46 is to prevent walls 24 and 26 from being outwardly away from the wedge outer surfaces 40, 41 which would make it easier for the bonds between the surfaces 40, 41 and the surfaces 28, 32, respectively, to fail. With this purpose in mind it becomes apparent that many possible cross sectional shapes for the stiffeners 44 and 46 would be satisfactory, and the C-shape is not at all critical to the present invention. In this exemplary embodiment the outer surfaces 30 and 34 of the walls 24 and 26 respectively are bonded to the abutting surfaces of the stiffeners 44 and 46 in a manner similar to the bond between the surfaces 40, 41 and the surfaces 28, 32; this doubles the already large bond area, although this joint construction may work satisfactorily in many applications without the presence of this additional bond. For example, assuming a radial force F on the strut 18, represented by the arrow 52 in FIG. 5, the integrity of the joint construction is maintained without the necessity of this additional bond as long as the wedge 38 does not collapse inwardly and as long as the bond between the surfaces 40, 41 and the surfaces 28, 32 remains intact. For many applications this bond would be adequate. The constant compressive force between the surfaces 40, 41 and the surfaces 28, 32 and the lower shear force on the bond due to the resolution of forces between those surfaces as a result of the wedging action, permit a much higher radial load in the direction 52 than would otherwise be the case. The ideal joint construction is to have the joint at least as strong as the strut itself in order to take full advantage of the high tensile strength of the filaments within the strut, for the strut is only as useful as the strength of the joint.

As it happens in this embodiment, the duct wall 12 is not sufficiently strong in hoop strength to carry the loads imposed by the strut; for that reason the composite annular rings 14, 16 are provided. As best shown in FIG. 1, radially extending flanges such as 58 and 60 are provided at each end of the stiffener 44 and 46; these flanges are secured to the rings 14 and 16 by any suitable means such as rivets 62. Backup plates 64 are used to provide a bearing surface for the rivet heads to protect the composite ring material. In this way, the major portion of the radial, torsional, and bending loads are directed into the rings 14 and 16 rather than into the thin duct wall 12.

Figure 4:
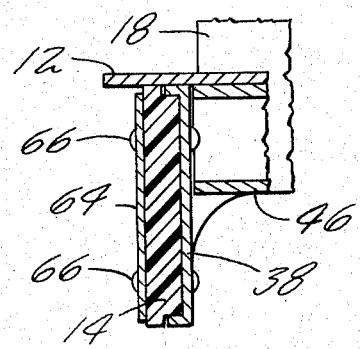
FIG. 4 is a sectional view taken along the line 4—4 of FIG. 2.
Figure 6:
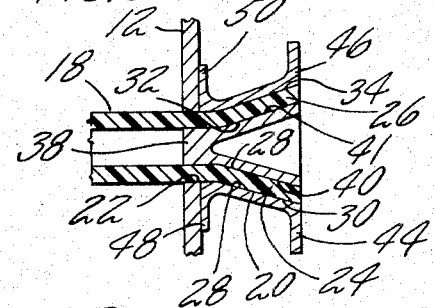
FIG. 6 is a sectional view taken along the line 6—6 of FIG. 2.
Figure 5:
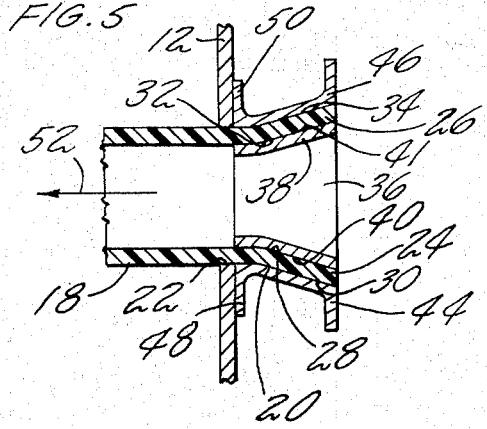
FIG. 5 is a sectional view taken along the line 5—5 of FIG. 2.
Figure 7:
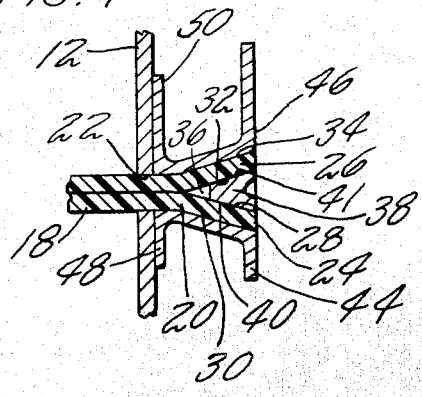
FIG. 7 is a sectional view taken along the line 7—7 of FIG. 2.

Although not required for many applications of this joint construction, the wedge 38 is also shown in FIGS. 3 and 4 as being attached by rivets 66 to the annular rings 14, 16. This simply adds to the overall strength and integrity of the joint construction.

The radially innermost end of the strut 18 is not shown in the drawing; however, it is preferably, although not necessarily, joined to radially inner duct structure in a manner similar to the radially outer end as hereinbefore described.

Although this invention has been described with respect to preferred embodiments thereof, it should be understood by those skilled in the art that various changes and omissions in the form and detail thereof may be made therein without departing from the spirit and the scope of the invention.

Having thus described typical embodiments of our invention, that which we claim as new and desire to secure by Letters Patent of the United States is:

1. In a gas turbine engine, a joint construction comprising:
    duct means having a longitudinal axis and including a substantially cylindrical duct wall surrounding said axis and concentric thereto, said duct wall having an opening therethrough;

a strut extending substantially radially with respect to said axis, said strut comprising tensile filaments within a matrix material, at least a portion of said filaments disposed substantially radially with respect to said axis for strength in a radial direction, said strut including an end portion extending substantially radially through said opening, said end portion including wall means, said wall means including inner surface means and outer surface means, said inner surface means defining at least one wedge-shaped cavity, said wedge shape tapering in a radial direction toward said opening, said outer surface means being substantially parallel to said inner surface means;

at least one wedge, substantially the shape of said cavity, disposed within said cavity and bonded to the surface thereof; and stiffener means having surface means substantially surrounding and in face-to-face abutting relationship to said outer surface means, said stiffener means being fixedly attached to said duct means for transferring loads from said strut to said duct means.

2. The joint construction according to claim 1 wherein said strut is hollow and said wedge has at least one substantially radial opening therethrough in gas communication with the inside of said hollow strut.

3. The joint construction according to claim 2 wherein said strut is airfoil shaped in cross section and includes a leading and trailing edge, and said wedge-shaped cavity extends substantially from said leading edge to said trailing edge.

4. The joint construction according to claim 3 wherein said outer surface means is bonded to said stiffener surface means.

5. The joint constuction according to claim 1 wherein said strut is airfoil-shaped in cross section and includes a leading and trailing edge, and said wedge-shaped cavity extends substantially from said leading edge to said trailing edge.

6. The joint construction according to claim 5 wherein said duct means includes at least one annular ring for providing hoop strength for said duct wall, and said stiffener means and said wedge are fixedly attached to said ring.

7. The joint construction according to claim 5 wherein said outer surface means is bonded to said stiffener surface means, and said wedge is fixedly attached to said duct means.

8. The joint construction according to claim 1 wherein said outer surface means is bonded to said stiffener surface 9. The joint construction according to claim 3 wherein said wedge is fixedly attached to said duct means.

* * * * *

PO-1050
(5/69)

UNITED STATES PATENT OFFICE
CERTIFICATE OF CORRECTION

Patent No. 3,778,185    Dated December 11, 1973

Inventor(s) James S. Plowman and Ivar G. Fowkes

It is certified that error appears in the above-identified patent and that said Letters Patent are hereby corrected as shown below:

Column 1, after the title, insert the following paragraph:

--The invention herein described was made in the course of or under a contract with the Department of the Air Force.--

Column 1, line 21: "blending" should read --bending--

Column 1, line 34: "face" should read --fact--

Column 2, line 17: "blending" should read --bending--

Column 3, line 65: "being" should read --bending--

Claim 5, column 6, line 8: "constuction" should read --construction--

Claim 8, column 6, line 24: after the word "surface" insert --means.--

Signed and sealed this 23rd day of April 1974.

(SEAL)
Attest:

EDWARD M.FLETCHER,JR.
Attesting Officer

C. MARSHALL DANN
Commissioner of Patents